No. 890,336. PATENTED JUNE 9, 1908.
G. H. COATES.
FLEXIBLE SHAFT.
APPLICATION FILED SEPT. 12, 1906.

Witnesses
Roy D. Tolman.
Penelope Comberbach.

Inventor
George H. Coates
By Rufus B. Fowler
Attorney

UNITED STATES PATENT OFFICE.

GEORGE H. COATES, OF WORCESTER, MASSACHUSETTS.

FLEXIBLE SHAFT.

No. 890,336.        Specification of Letters Patent.        Patented June 9, 1908.

Application filed September 12, 1906. Serial No. 334,360.

*To all whom it may concern:*

Be it known that I, GEORGE H. COATES, a citizen of the United States, residing in Worcester, in the county of Worcester and Commonwealth of Massachusetts, have invented a new and useful Improvement in a Flexible Shaft, of which the following is a specification accompanied by drawings, forming a part of the same, in which—

Figure 1:
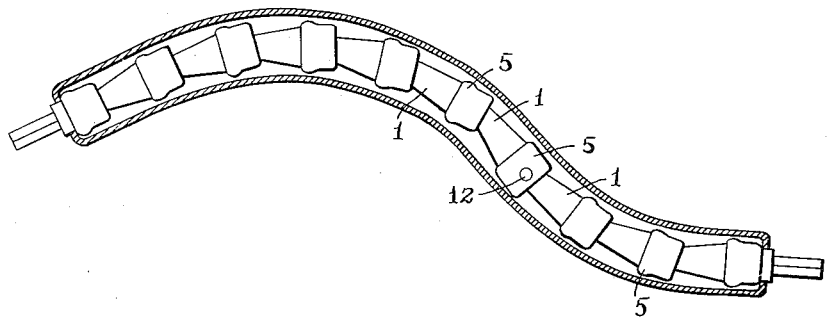
Figure 2:
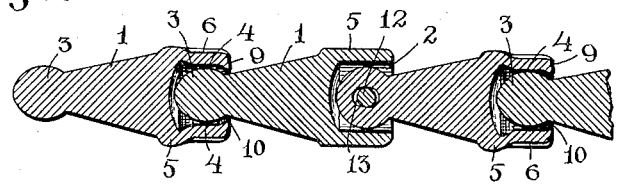
Figure 3:
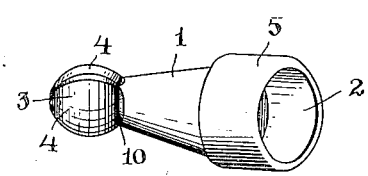
Figure 5:
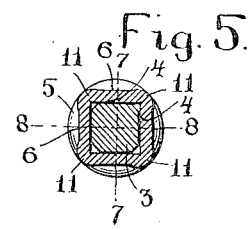
Figure 4:
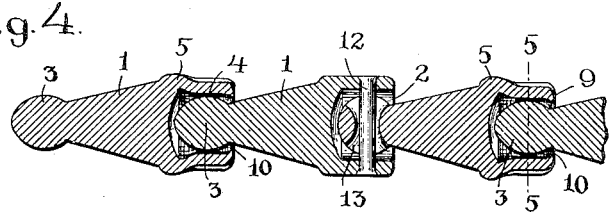

Figure 1 represents a portion of a flexible shaft embodying my invention with inclosing case shown in the central sectional view. Fig. 2 represents in the center a longitudinal sectional view, and on a larger scale several of the links of which my flexible shaft is composed. Fig. 3 represents in perspective view one of the links of which my shaft is composed, showing the form of the link before it is assembled with other links to form a flexible shaft. Fig. 4 is a central sectional view of several of the links forming my improved flexible shaft, but shown on a plane at right angles to the section represented in Fig. 2. Fig. 5 is a transverse sectional view along line 5—5, Fig. 4.

Similar reference letters and figures refer to similar parts in the different views.

My present invention relates to that class of flexible shafts which are composed of a series of links hinged or otherwise connected together so that a rotary movement of any one of the links composing the shaft will be communicated to its adjacent connecting link, notwithstanding that the axes of the connecting links are out of alinement. In forming the flexible shaft shown in the accompanying drawings, the several links composing the shaft are similar in shape, and each of the links is provided at one end with a socket adapted to receive the end of the next adjacent link which is inserted therein.

In the construction of my improved flexible shaft the form of each link as shown in perspective view in Fig. 3, consists of a body portion 1 at one end of which is a cylindrical socket 2, and at the opposite end is a tip 3, approximately spherical, and having its sides flattened as shown at 4 Figs. 3 and 5. The other links are assembled to form the shaft by inserting the tip 3 within the cylindrical socket 2 and compressing the wall 5 of the spherical socket on diametrically opposite sides of the tip, as shown at 6, Fig. 5.

The compression of the wall 5 of the socket corresponds with the flattened sides 4 of the tip, and the wall of the socket is brought into sufficiently close contact with the flattened sides 4 of the tip to cause the rotary movement of the latter to be imparted to the wall of the socket. The curvature of the flattened sides 4 of the tip, however, permit a rocking movement of the tip within the socket in the planes indicated by the broken lines 7—7 and 8—8, Fig. 5, while the edge 9 of the wall 5 of the socket is turned slightly inward upon the narrow neck 10 of the pin to prevent the withdrawal of the tip of the socket. The above described construction enables the axis of the link to be brought at an oblique angle to the axis of its connecting link, and at the same time enables the rotary motion of one link to be imparted to its connected link. This method of uniting the connecting ends of the links obviates the necessity of forming holes through the ends of the links to receive pivotal pins which tends to weaken the shaft and increases the wearing surfaces. The compression of the sides of the wall 5 of the socket on the four sides corresponding to the flattened sides of the tip is readily accomplished, as the surplus material in the wall of the socket is allowed to expand at the corners as shown at 11, Fig. 5.

By the above construction the rotary motion of one link is imparted to its connecting link by bodily contact of the flattened sides 4 against the rectangular inner surface of the socket. In wear the contacting surface of the links may be taken up by the further compression of the sockets against the tips 3, or by the substitution of new links. In order to enable the sections of the shaft to be removed and replaced I unite the connected links at intervals without compression of the socket 2 by means of a pin 12, Fig. 4, held in the socket and passing through an elongated hole 13 in the tip of the adjacent link, thereby enabling the chain to be separated at this point by the removal of the pin. For convenience in replacing portions of the shaft, the entire shaft may be divided into several sections connected by pins 12, thereby allowing any one of the sections to be removed and replaced by a new section.

I claim,

1. In a flexible shaft, the combination with a series of connected links having articulated joints consisting of a tip polygonal in cross section located within the corresponding socket integral with the connected link, whereby the rotary motion of one link is imparted to its connected link, said socket having its walls corresponding in form with the polygonal sides of said tip.

2. In a flexible shaft, the combination of a link provided with a tip approximately spherical in its longitudinal section and approximately polygonal in its cross section, and a connected link provided with an integral socket at one end, said socket corresponding in form with the sides of said tip.

3. In a flexible shaft, the combination of a series of similar connected links, each of said links having at one end a tip substantially polygonal in cross section and having curved sides in its longitudinal section and having at its opposite end an integral socket inclosing the tip of the next adjacent link, said socket having its inner wall corresponding substantially to the polygonal sides of said tip and having the opening at the outer edge of said socket smaller than said tip to prevent the removal of the tip from the socket.

4. In a flexible shaft, the combination of two connected links of similar form and united by an articulated joint, consisting of a tip on the end of one link having substantially polygonal sides and an inclosing socket on the end of the other link and integral therewith with its sides corresponding in form to the sides of the tip.

GEORGE H. COATES.

Witnesses:
    PENELOPE COMBERBACH,
    RUFUS B. FOWLER.